United States Patent [19]

Soo Hoo

[11] Patent Number: 4,807,999
[45] Date of Patent: Feb. 28, 1989

[54] TWO SOURCE PASSIVE RING LASER GYROSCOPE

[75] Inventor: Kie L. Soo Hoo, Anaheim, Calif.

[73] Assignee: Rockwell International Corporation, El Segundo, Calif.

[21] Appl. No.: 839,292

[22] Filed: Mar. 13, 1986

[51] Int. Cl.$^4$ .............................................. G01C 19/64
[52] U.S. Cl. ...................................... 356/350; 372/94
[58] Field of Search ........................... 356/350; 372/94

[56] References Cited

U.S. PATENT DOCUMENTS

| | | | |
|---|---|---|---|
| 3,390,606 | 7/1968 | Podgorski | 356/350 |
| 4,135,822 | 1/1979 | Ezekiel | 356/350 |

OTHER PUBLICATIONS

Passive ring resonator method for sensitive inertial rotation measurements in geophysics an relativity, Sanders et al, Optics Letters, 11–1981, pp. 569–571.

Primary Examiner—Vincent P. McGraw
Assistant Examiner—S. A. Turner
Attorney, Agent, or Firm—H. Fredrick Hamann; George A. Montanye; James F. Kirk

[57] ABSTRACT

A two source passive ring resonator gyroscope having a single piece body with integral first, second and third resonator cavities. A first laser means uses the first resonator cavity to provide a first single frequency light source. A second laser uses the second resonator for a second laser to provide a second single frequency light source. The third resonator cavity is a passive high Q evacuated cavity having a closed optical path tuned to resonate at substantially the light frequency of the first and second resonator cavities. The first signal frequency light source is split into a propagating light source and a first reference frequency light source. The propagating source is coupled into the third resonator cavity to form a propagating light beam. The second single frequency light source is split into a second frequency light source and into a second reference frequency light source. The light from the second frequency light source is modulated at the reference carrier frequency (FO) to form a carrier modulated offset frequency counterpropagating light source. This source is coupled into the third resonator cavity. Two cavity servos respond to the first and second dither signals to provide control signals to the first and second laser transducers to control the resonant frequency of the first and second single frequency light sources.

19 Claims, 10 Drawing Sheets

FIG. 2 TOP PLAN VIEW

FIG. 3 FRONT VIEW

FIG. 4 REAR VIEW

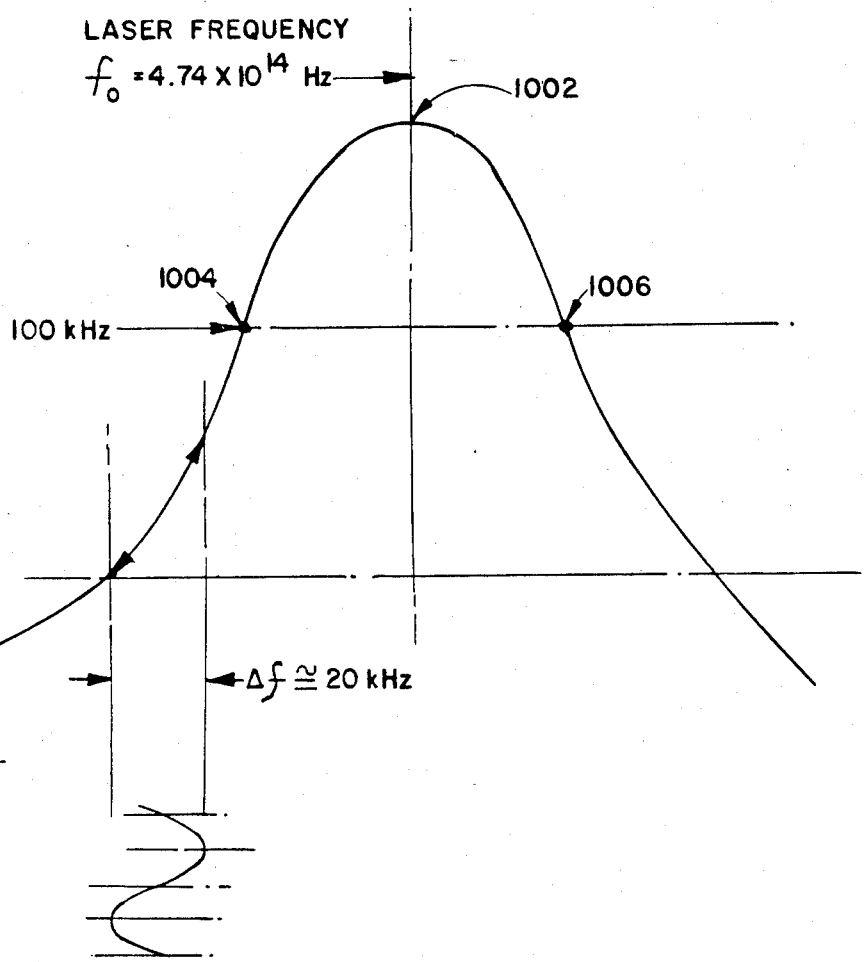
FIG. 10a
FIG. 10b
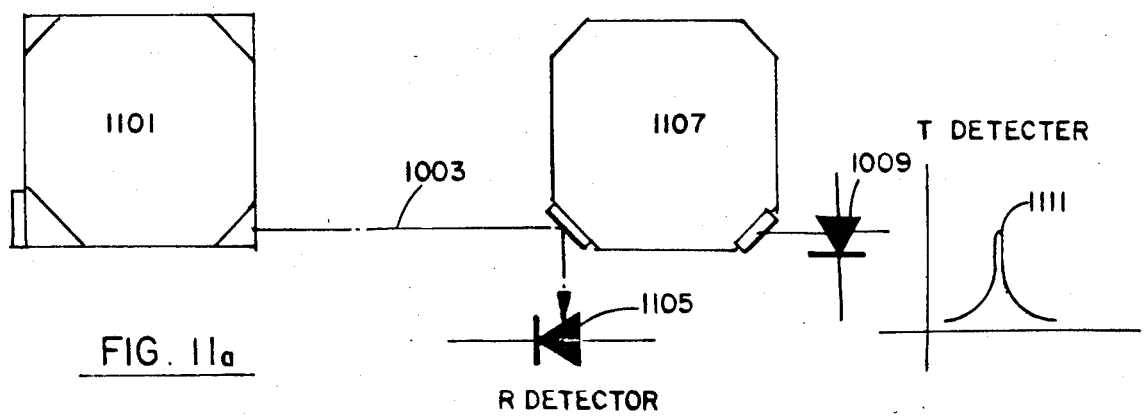
FIG. 11a
FIG. 11b
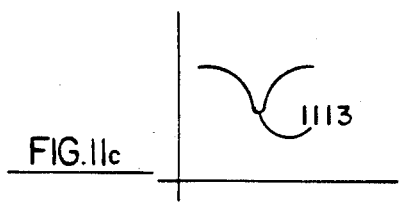
FIG. 11c

TWO SOURCE PASSIVE RING LASER GYROSCOPE

BACKGROUND OF THE INVENTION

1. Field of the Invention

The present invention relates to optical gyroscopes and more particularly to passive ring resonator gyroscopes which have bias and frequency errors resulting from mechanically or thermally induced dimensional changes.

2. Description of Prior Art

This application relates to a first application titled "PASSIVE RING RESONATOR GYROSCOPE", filed Nov. 29, 1984, having Ser. No. 676,322, and a second application titled, "TWO SERVO LOOP PASSIVE RING LASER GYROSCOPE", filed Feb. 13, 1985 having Ser. No. 701,879 and each having a common assignee. The first previous application described a laser gyro having a single piece body incorporating a linear laser light source, a passive resonant cavity and which relies on three active servo loops for operation.

The second previous application described a laser gyro having a single piece body incorporating one linear laser light source, a passive resonant cavity and which relies on two active servo loops for operation.

In a passive ring resonator gyroscope, a pair of monochromatic light beams counterpropagate about a closed-loop optical path, which forms a high Q resonant optical circuit. The stability of the path length between reflective surfaces forming the closed path is critical in maintaining resonance in the passive ring resonator cavity since dimensional changes contribute to bias frequency errors. The relationship between a linear laser[1] and a ring resonator to form a prior art passive ring resonator gyro is depicted in an article by S. EZEKIEL and S. R. BALSAMO titled "A Passive Ring Laser Gyroscope", *Applied Physics Letters*, Vol. 30, No. 9, 1 May 1977, pg. 478–480. (NOTE: Usually a resonator is conceived as a linear or standing wave resonator in which the light completes an optical round trip by reflecting off a mirror and retracing its path. These forward and backward waves create a standing wave in the cavity. In a ring resonator, the light completes an optical round trip without retracing its path and hence the path encloses an area as shown in Ezekiel's paper.)

[1]For description of lasers and resonators refer to: Yariv, A., *QUANTUM ELECTRONICS* (John Wiley & Sons, 1975) or Sargent, M., et.al., *LASER PHYSICS* (Addison-Wesley Pub., 1974).

In the passive ring resonator, such as that described in the EZEKIEL reference, the two beams, traveling in opposite directions around the closed-loop optical path, are injected into the passive ring resonator from a single frequency light source. As the ring resonator gyroscope cavity rotates in inertial space, the two counterpropagating beams travel unequal path lengths. This path difference, due to rotation in inertial space, gives rise to a relative frequency difference (Sagnac effect[2]) between the two counterpropagating beams. (NOTE: A ring resonator, as opposed to a linear resonator, can exhibit the Sagnac effect and detect inertial rotation.)

[2]E. J. Post, "Sagnac Effect", *Review of Modern Physics*, Vol. 39, No. 2, April 1967, p. 475–493.

The relative frequency difference is detected as a changing interference fringe pattern which is then electronically interpreted to indicate the direction and inertial rate of rotation of the passive gyro about the gyro's sensitive axis. The sensitive axis of the gyro is along the direction normal to the plane of the passive resonator.

The single frequency light source for the passive resonator is typically an external linear laser. *Spectra Physics Inc.* of Sunnyvale, Calif. produces stabilized lasers with the required characteristics.

It is known that bias errors in the detected signal of a ring resonator gyro result from dimensional changes in the laser and in the passive ring resonator. Bias errors also result from Fresnel Drag; these errors arise from the presence of gases (e.g. air) in the path of the counterpropagating beams in the resonator. Bias errors are typically characterized as a frequency difference between the two beams which is not related to the rotation rate. Bias errors are sometimes detected as a frequency difference in the absence of rotation or as post calibration changes in the frequency difference for a specific absolute inertial rotation rate.

The Passive Ring Resonator Gyroscope of the type described in the EZEKIEL reference is typically constructed by placing optical elements, such as mirrors, beamsplitters, etc. on an optical bench. The location, spacing and geometrical relationships between the elements of the gyro function to enhance the passive ring resonator gyroscope's sensitivity and stability. Experimental passive ring resonator gyroscopes typically have path lengths of a few meters making them unsuitable for use as a navigational instrument. The large size of prior art passive ring resonator gyroscopes, such as that characterized in the EZEKIEL reference, also contributes to the likelihood of bias errors due to mechanical coupling and mechanical drift of the optical elements in response to physical and thermal forces acting on the laser and on the optical table or bench.

SUMMARY OF THE INVENTION

The objective of this invention is to provide a passive ring resonator gyro suitable for use as a navigational instrument having reduced bias errors and bias error sensitivity while having enhanced stability and sensitivity. This is accomplished by constructing a gyro having two source lasers and ring resonator from one body in which the total resonator path length is substantially below a half meter.

Another objective of this invention is to provide a Two Source Passive Ring Laser Gyroscope using two frequency tracking servos for peaking the intensity of the CW (clockwise) and CCW (counterclockwise) propagating light beams in the passive cavity.

Another objective of the invention is to use only one A.O. (acousto-optic coupler) in the servo system.

A particular embodiment of this innovative passive ring resonator gyroscope has a single piece body, typically fabricated from a block of glass ceramic material such as ZERODUR$^R$, (a trademark of the JENA$^{ER}$ GLASSWERK SCHOTT & GEN. of MAINZ, GERMANY), which forms a fixed reference frame for all required optical elements, including the first, second and third resonator cavities. A first and second laser means, composed of linear or "L" shaped lasers uses the first and second cavities. Each of these lasers, when operated with suitable excitation, functions as a linear laser providing a source of single mode TEM$_{oo}$, single frequency light for the third resonator cavity.

In a more particular alternative embodiment, the first laser means, first resonator cavity has a transmitting optical port for transmitting stabilized single frequency light to said third resonator cavity. In addition, a second laser means, second resonator cavity has a transmitting optical port for transmitting stabilized, single frequency light to the third resonator cavity. The internal body-mounted reflective surfaces are coupled to and mechanically spaced by the single piece body. A gain medium, such as a Helium Neon gas mixture is contained in the first and second resonator cavities but the third cavity is evacuated.

A means for exciting the gain mediums to induce lasing in the first and second resonator cavities is provided. The output of the single frequency light sources are directed through at least one transmitting optical port of each of the first and second resonators.

The third resonator cavity and its reflective elements form a passive high Q cavity having a closed optical path tuned to resonate at substantially the same frequency as the first resonator cavity. Means are provided for coupling the two single frequency light sources from the first and second resonator cavities into the third passive resonator cavity, thereby forming CW and CCW light beams in the third resonator. These means are implemented using conventional mirrors, lenses and beamsplitters.

The third resonator cavity is oriented and dimensioned in relation to the first and second resonator cavities to have substantially equivalent optical path length changes in response to any induced body dimensional changes. The fixed relationship of the two laser sources and the passive ring resonator eliminates beam misalignment caused by the relative motion of the two source lasers and the passive resonator. Bias errors are diminished since the passive ring resonator is a passive device and has no internal excitation to frequency shift the cavity resonances. Bias errors due to axial gas flow or Fresnel drag is eliminated since the third resonator is evacuated. Taken together, these features form a gyroscope with increased stability and reduced bias errors.

A cavity servo means is provided for controlling the resonant frequency of the first laser means single frequency light source to track the resonant frequency of the third resonator clockwise (CW) beam FCW. The cavity servo has a first control loop that locks the first laser's single frequency light source to the FCW resonance. The first cavity servo loop is synchronized with and is responsive to the clockwise intensity control signal at a first dither signal frequency for providing a first cavity path length control signal. The first servo means enables the first cavity to track the resonant frequency of the third resonator's FCW beam. The cavity servo has a second control loop that locks the second laser means single frequency to maximize the resonance of the counterclockwise (CCW), FCCW beam.

The first cavity has a first cavity path length adjusting means such as a piezoelectric transducer responsive to the first cavity path length control signal for shifting the resonant frequency of the first cavity. The first cavity path length adjusting means shifts the frequency of the first single frequency light source in response to the FCW intensity control signal to maximize the intensity of the third resonator CW beam.

The second cavity has a second cavity path length adjusting means for shifting the frequency of the second cavity single frequency light as it enters the third resonator to form the CCW beam. The servo means has a second loop that responds to intensity peak of the CCW beam modulated at a second dither signal in the third resonator.

The second control loop applies a control signal to the second cavity path length adjusting means to tune the third resonator clockwise beam modulated at a second dither signal frequency.

In this embodiment, a means for detecting the frequency difference between the clockwise and the counterclockwise beams provides a signal representing a measure of the input body rate.

BRIEF DESCRIPTION OF THE DRAWINGS

FIG. 10a shows a waveform depicting the response characteristic and center frequency of a passive resonator for use with a HeNe laser.

FIG. 10b is a wave form showing by a projection onto FIG. 9a, a typical modulation range used in conjunction with a HeNe laser synchronous demodulator system.

FIG. 11a shows the relative position of two detector diodes in relation to a laser source on the left and a passive cavity on the right.

FIG. 11b shows the response characteristic of the rightmost detector.

FIG. 11c shows the response characteristic of the lower detector.

DESCRIPTION OF THE PREFERRED EMBODIMENT

Figure 1:
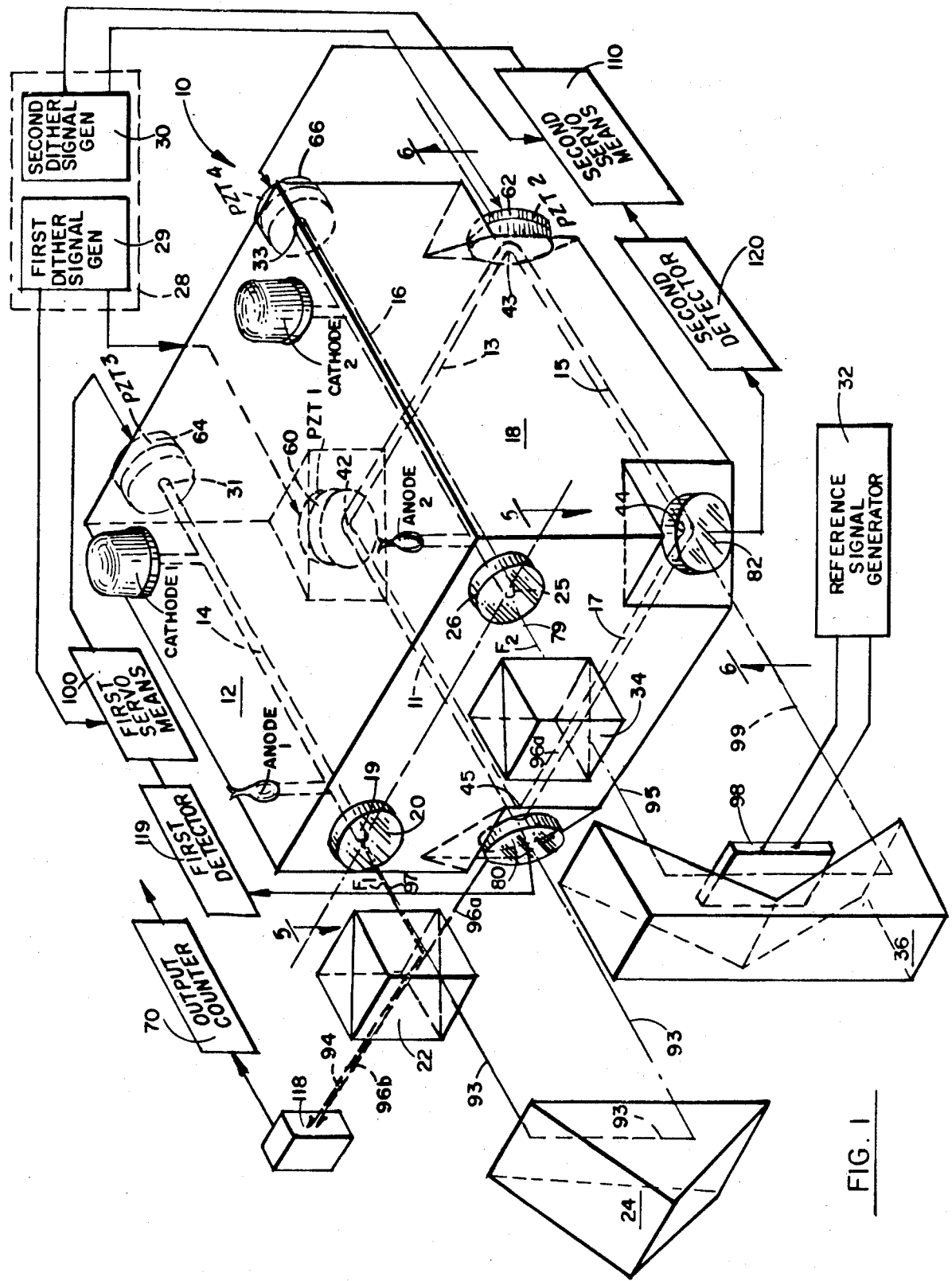
FIG. 1 is a prospective view of the two source passive ring resonator gyroscope.

Referring now to FIG. 1, an embodiment of the invention two source passive ring resonator gyroscope 10 is depicted having a single piece body 12 having integral first, second and third resonator cavities 14, 16, 18. The term "integral" is meant to convey the idea that the body 12 is formed from one homogenous piece of material such as ZERODUR. The top layer shows a first and second cavity, each being linear lasers. The output of the linear lasers are not influenced by inertial rate inputs to the gyroscope.

A dither signal means 28 houses the first and second dither signal generators 29, 30 to provide first and second dither signals at first and second dither signal frequencies (Fm1, Fm2) to the passive cavity's transducers 60, 62 such as piezoelectric transducers PZT1, PZT2, respectively.

The reference signal generator 32 provides a reference carrier signal at a frequency of FO (typically 50 mHz) to A/O (acousto-optic) device 98.

The gyro has a sensitive axis 54, illustrated in greater detail in connection with FIG. 3 and FIG. 4, that is responsive to an input body rate.

Referring again to FIG. 1, the first laser means (cavity 14) is shown sourcing single frequency light Fl through the first resonator partially transmissive mirror 20 to beamsteering optics comprising in combination prism 24 and beamsplitter 22. Beamsteering optics couples the single frequency light Fl as beam 93 through third resonator's clockwise beam entry at the left partially transmissive MIRROR 80.

FIG. 1 also shows that the second laser means uses the second resonator cavity 16 and has a second laser transducer 66 (PZT4) to provide a second single frequency light source (F2)through partially transmissive mirror 26.

The third resonator cavity 18 is a passive high Q evacuated cavity having a closed optical path with first, second, third, and fourth segments, 11, 13, 15, 17 tuned in combination to resonate at substantially the light frequency of the first and second resonator cavities. The sensitive axis characterized by Vector 54 is essentially normal to the plane of the closed second optical path established by the plane of segments 11, 13, 15, 17.

First beamsplitter 22 and prism 24 function as a means responsive to the first single frequency light source 97 at frequency Fl through mirror 20 for splitting the first single frequency light Fl into a first frequency partial light source along phantom line 93 and a reference first frequency light source beam 94. The propagating source 93 is coupled into the third resonator cavity 18 via partially transmissive mirror 80 to form a propagating light beam (FCW) (not shown).

Second beamsplitter 34 and beam steering reflector 36 in combination represent a means responsive to the second single frequency light source 79 at frequency F2 for splitting the second single frequency light source into a second frequency partial light source, beam 95 and into a reference second frequency light source 96a. The reference second frequency source 96a is directed to first beamsplitter 22 to emerge as beam 96b in coaxial alignment with reference first frequency light source 95. These two beams are displaced from each other in FIG. 1 to permit individual identification. The combined beam is focused on output detector 118. This detector is typically a silicon photodiode, such as model FND-100 by EG&G Corp. of Wakefield, Mass.

The output of detector 118 is typically a conditioned signal such as a sine wave having an amplitude selected to be compatible with the input signal requirements of output counter 70.

Output counter 70 is typically a counter such as a HP3335 by Hewlett Packard for use in a laboratory, but in alternative product designs, the counter would be fabricated from conventional high speed logic circuit elements such as MECL or ECL logic by MOTOROLA suitable for use at frequencies at and above FO, the frequency of the reference signal generator (to the AO).

Acousto-optic device 98 represents a means responsive to the output signal of the reference signal generator 32 for modulating light from the second frequency partial light source at the reference carrier frequency (FO) to form a carrier modulated at an offset frequency of FO+F2 to form counterpropagating light source 99. The carrier modulated offset frequency counterpropagating light source is coupled into the third resonator cavity 18 via partially transmissive mirror 82 to form a counterpropagating beam (FCCW) (not shown).

First detector 119, first servo 100, and second detector 120, second servo 110 sample and are responsive to the FCW and FCCW beams, respectively. These elements represent in combination, a cavity servo means responsive to the first and second dither signals Fml, Fm2. They provide control signals to the first and second laser transducers 64, 66 to control the resonant frequency of the first and second single frequency light sources (Fl, F2). The first single frequency light source is tuned to control and maintain the clockwise propagating (FCW) light beam in the third resonator at peak resonance. The second single frequency light source is tuned to control and maintain the carrier modulated offset frequency counterpropagating light beam (FCCW) at peak resonance.

Output counter means 70 is provided for measuring the frequency difference between the first reference frequency light source 94 and the second reference frequency light source 96b. The measured frequency difference represents the difference in frequency due to an input gyro body rate about axis 54 increased by the fixed frequency of the carrier offset frequency (FO) due to the frequency modulation by AO device 98 in response to signal FO from the reference signal generator 32.

Figure 2:
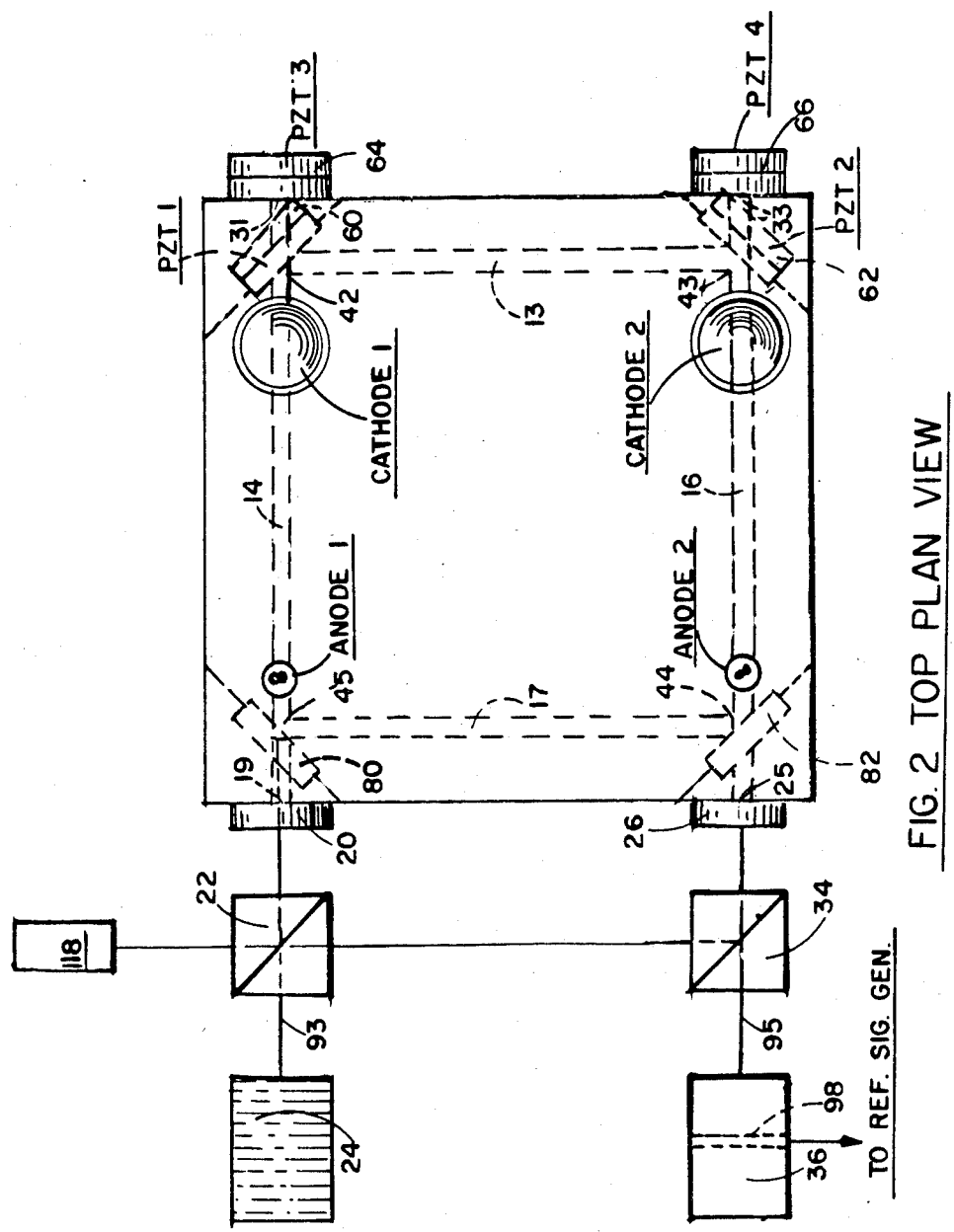
FIG. 2 is a top plan view of the two source passive ring resonator gyroscope body.

FIG. 2 is a top plan view of the two source passive ring laser gyroscope 10 of FIG. 1 showing the first, second and third resonator cavities in phantom. Left and right partially transmissive mirrors 80, 82 represent first and second partially transmissive and receiving ports.

Figure 3:
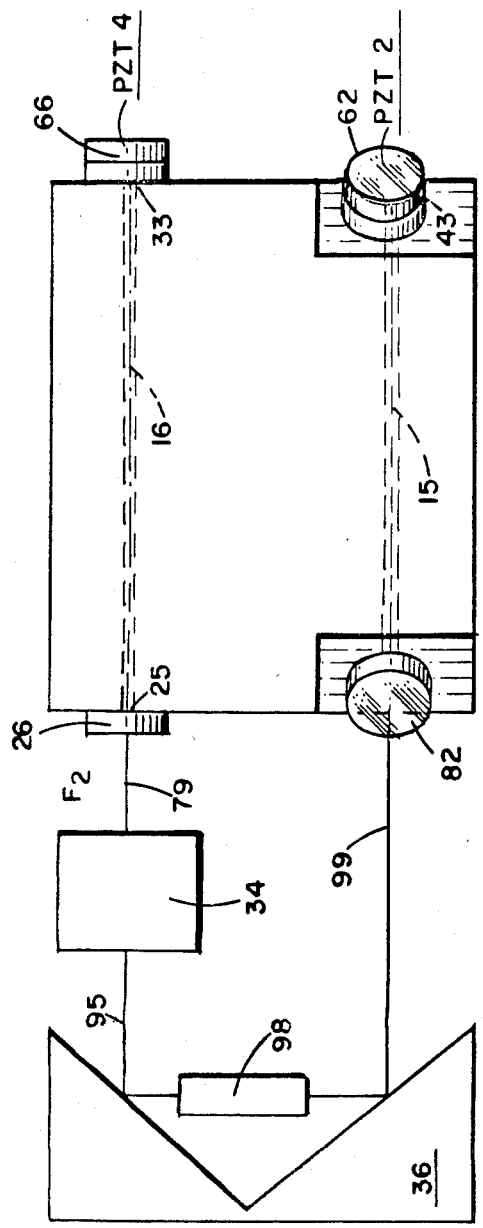
FIG. 3 is a front view of the passive ring resonator gyroscope body.
Figure 4:
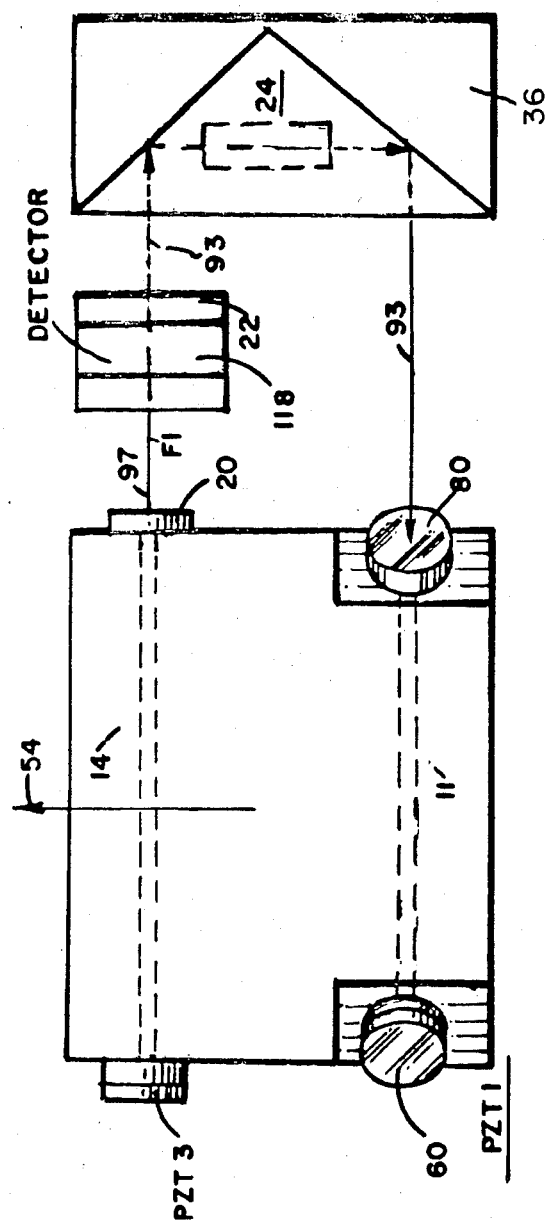
FIG. 4 is a rear view of the passive ring resonator gyroscope body.

FIGS. 3 and 4 are respective front and rear views.

Figure 5:
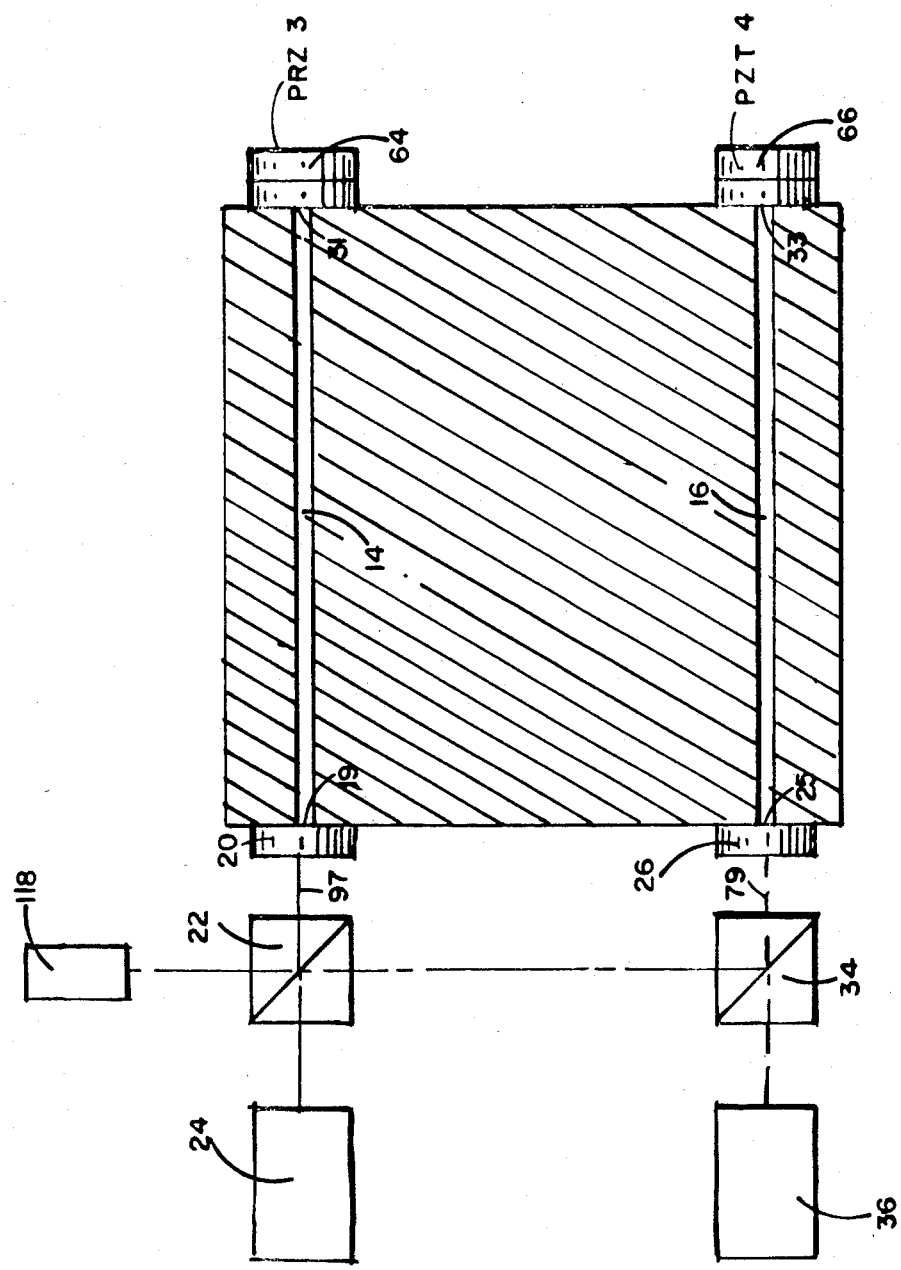
FIG. 5 is a sectional view of the passive ring resonator gyroscope body taken along line 5—5.

FIG. 5 is a sectional view along 5—5 of FIG. 1 to show the interior of the first and second laser means first and second resonant cavities 14, 16.

Figure 6:
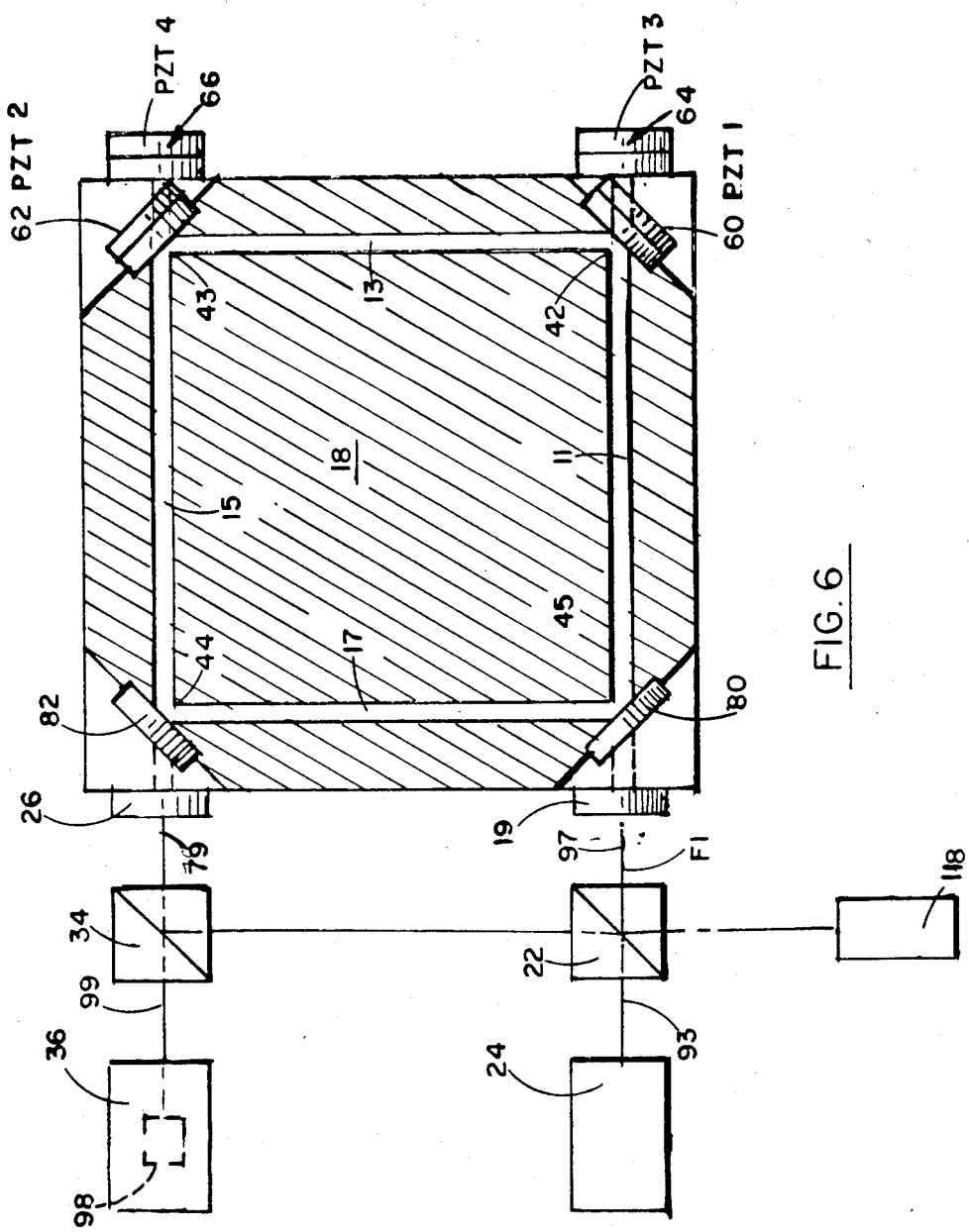
FIG. 6 is a sectional view of the two source passive ring resonator gyroscope body taken along sectional line 6—6.

FIG. 6 is a sectional view of FIG. 1 taken line 6—6 from the bottom looking up to show the third resonator cavity and the position of the first and second partially transmissive and receiving ports 80, 82.

The first partially transmissive and receiving port 80 is characterized to receive and pass the first single frequency partial light source 93 into the third resonator cavity 18 to form the propagating light beam (FCW).

The second partially transmissive and receiving optical port 82 is characterized to receive and pass the carrier modulated offset frequency beam 99 into the third resonator 18 cavity to form a counterpropagating light beam (FCCW).

Figure 7:
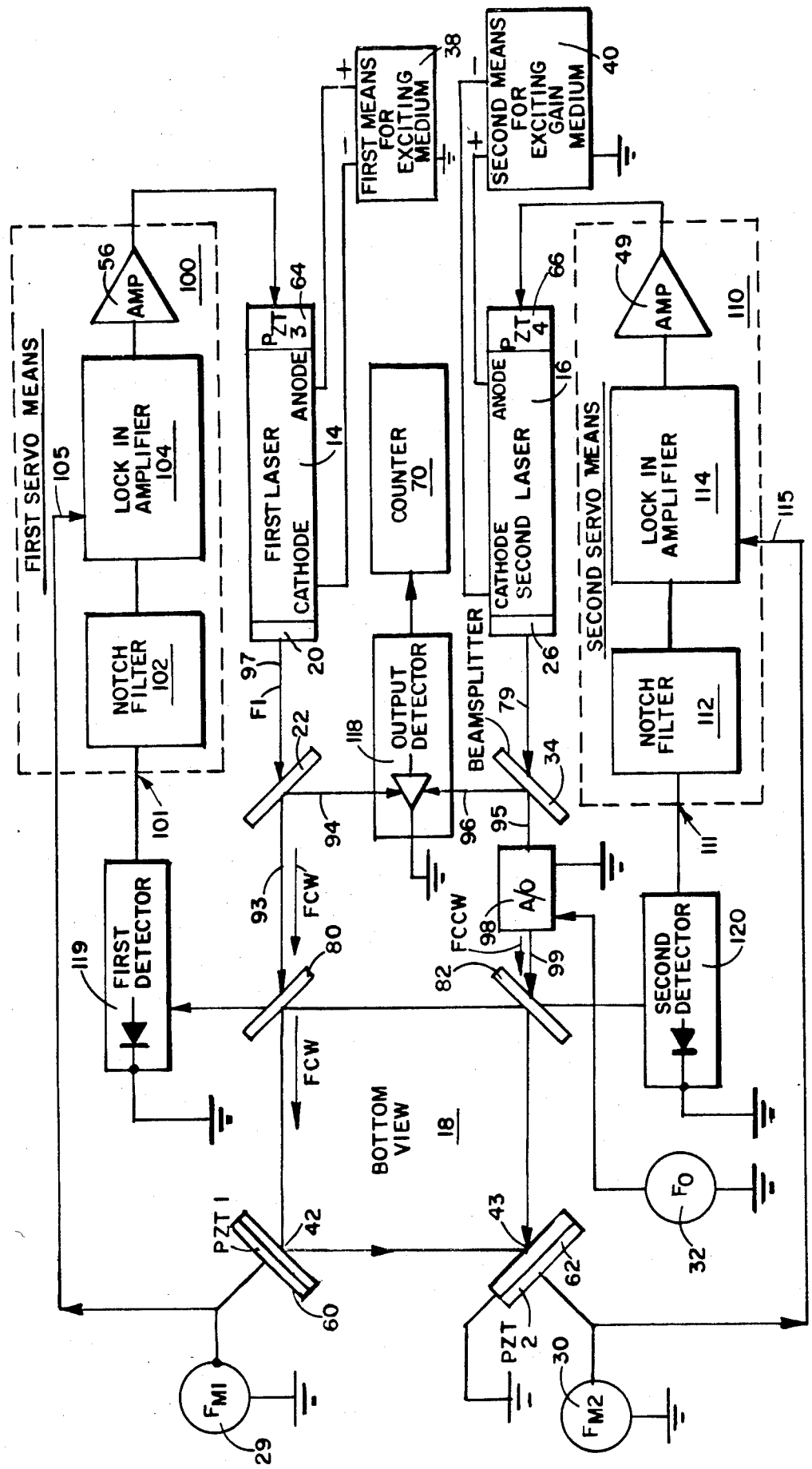
FIG. 7 is a combination schematic and block diagram of the associated electronics and optical elements of the two source passive ring resonator gyroscope using two servo control loops.

PZT1 and PZT2 60, 62 shown in FIG. 7 represent piezoelectric transducers. PZT1 and PZT2 each function as an electromechanical transducer, attached to reflective surfaces 42, 43 so as to modulate the third resonator optical path length at the respective dither frequencies Fml and Fm2. Each PZT has a respective input terminal coupled via a signal line to the respective dither signal source.

The first cavity transducer 60 is positioned to drive a first reflective surface 42 in the third resonator cavity 18 having segments 11, 13, 15, 17. The first cavity transducer is responsive to the first dither signal from the first dither signal source 29 at the first dither signal frequency Fm1 for modulating the optical path length of the third resonator cavity 18 at a first dither signal frequency. The Fm1 oscillator is typically a stabilized oscillator operating at 1.0 kHz.

A second cavity transducer 62 is positioned to drive a second reflective surface 43 in the third resonator cavity 18. The second cavity transducer 62 is responsive to the second dither signal from the second dither signal source at the second dither signal frequency Fm2 for modulating the optical path length of the third resonator cavity at a second dither signal frequency. The Fm2 oscillator is typically a stabilized oscillator operating at 4.0 kHz.

The first detector 119 receives a large portion of the incident reflected light off the first partially transmissive and receiving port 80.

The second cavity detector 120 receives a large portion of the carrier modulated offset frequency light source beam 99 reflected off of the second partially transmissive and receiving port 82.

Ports 80 and 82 have reflective surfaces positioned to direct the respective incident beams to the respective diodes 119 and 120. The intensity of the light striking the diode has a high background level that dips as the resonant cavity 18 achieves resonance in response to a shift in frequency of the respective laser source. FIG. 11a characterizes a laser source directing a beam at a representative port with a portion of the beam being reflected to a sensing diode. FIG. 11c shows a dip in the background of the light intensity striking the sensing diode as the laser source at 1101 is tuned to the resonance point of the passive cavity within passive resonator 1107. FIG. 10a characterizes the response of a typical passive resonator having half-power points separated by 100 kHz. The dip represented by FIG. 11c would also typically have half-power points separated by 100 kHz. Typically, an HeNe input laser 110, would have its output at $4.74 \times 10^{14}$ Hz injected into the passive cavity 1107.

The first servo means is depicted within phantom block 100 and has a synchronizing input 105 responsive to the first dither signal from first dither signal generator 29 and a signal input 101 responsive to the output signal of the first detector 119. The first servo means provides an output signal to the first laser transducer 64 to tune the first single frequency light source from cavity 14 to maximize the frequency and intensity modulated signal detected by the first detector 119.

The second servo means within phantom block 110 has a synchronizing input 115 responsive to the second dither signal at a frequency of Fm2 from the second dither signal generator 30 and a signal input 111 responsive to the output signal of the second detector 120. The second servo means provides an output signal to the second laser transducer PZT4 66 to tune the second single frequency light source from cavity 16 to maximize the frequency and intensity modulated signal detected by the second detector 120. The frequency of the clockwise and counterclockwise beams are constantly adjusted by the two servos to compensate for effective path length changes due to body rate inputs to the passive ring resonator gyroscope sensitive axis 54.

FIG. 6 shows the third resonator cavity in section as viewed from the bottom surface to the top of the gyro. The third cavity 18 has first, second, third and fourth evacuated hollow segments, 11, 13, 15, 17. In the case of a triangular cavity (not shown) only three segments would be used. The segments of cavity 18 are coupled at their ends to form a closed planar evacuated path. For example, one end of segment 11 is joined with one end of segment 13 at an intersection where mirror surface 42 is attached to PZT1 60.

A reflective means such as a highly reflective mirror at 42, provides a reflective surface at the intersection of each pair of segments to form a closed optical path.

FIG. 3 shows the means for modulating light from the second frequency partial light source (beam 95) as the combination of an acousto-optic transducer 98 positioned to receive the second frequency partial light source (beam 95) and the output of reference signal generator 32 at the reference carrier frequency (FO) to form a carrier modulated offset frequency counterpropagating light source (beam 99) having a frequency equal to the frequency of the second frequency partial light source 95 plus the frequency of said reference carrier frequency FO. The frequency of FO is typically 50 mHz.

In another alternative embodiment of the two source passive ring laser gyro 10, the third resonator cavity 18 is positioned and dimensioned in relation to the first and second resonator cavities 14, 16 to provide partial dimensional change compensation for optical path length changes in response to induced body dimension changes by temperature or external force. Bias errors relating to temperature induced body dimension changes or to changes from external forces applied to said body are cancelled providing a passive ring resonator gyroscope having enhanced stability using only two servos.

FIG. 5 shows the first resonator cavity 14 and second resonator cavity 16 in section. The first resonator cavity has a transmitting optical port means at first cavity port 20 for transmitting stabilized single frequency light F1 as ray 97, and at least two internal body-mounted reflective surfaces such as partially transmissive mirror 19 and mirror surface 31 on piezoelectric transducer PZT3 64. The second resonator cavity 16 has a transmitting optical port means at 26 for transmitting stabilized single frequency light F2 as ray 79, and at least two internal body-mounted reflective surfaces such as partially transmissive mirror 25 and mirror surface 33 on piezoelectric transducer PZT4, 66. Each of the four reflective surface is coupled to and mechanically spaced by the integral body 12.

An appropriate gain medium, such as a mixture of Helium and Neon, is contained in the first and second resonator cavities 14, 16 at a pressure in the range of 4 to 10 torr when sealed.

Referring to FIG. 7, blocks 38 and 40 represent respective first and second means for exciting the gain medium within said first and second cavities 14, 16 to induce lasing. The elements are not shown in the embodiment of FIG. 1 for clarity. These elements are typically controllable current sources capable of an output voltages determined by the ionization potential of the gas mixture and an output current capability of one to ten milliamperes.

FIG. 7 shows additional elements including first dither signal generator 29, a first servo means 100 and PZT3 64 which in combination represent a cavity servo means responsive to the intensity dip of the clockwise beam for adjusting the first resonator cavity's path length between the first cavity partially transmissive mirror 19 and the first cavity mirror 31 to maximize the intensity dip sensed by the first detector 119. The CW and CCW beams are frequency stabilized to their resonant peaks in the passive cavity.

FIG. 10a depicts the pass band of a typical passive cavity having a resonance peak at 1002. The approximate frequency spread between reference 1004 and 1006 is a typical frequency range between the half-power points and is included in FIG. 10a along with the indicated laser center frequency, to provide the reader with an understanding of the "Q" of the third resonator. The phrase "frequency stabilization" is understood to mean phase sensitive detecting and is also meant to include the principle of servo locking the laser output to the intensity peak of the passive cavity.

A HeNe laser typically has an instantaneous line width of less than one Hz but the operating frequency is subject to considerable jitter.

Referring again to FIG. 7, elements including the second dither signal generator 30, second servo means 110 and PZT4, 66 and the second detector 120 represent an output servo means responsive to the intensity dip of the counterclockwise beam for adjusting the frequency of the counterclockwise beam to maximize the intensity of the counterclockwise beam.

The first, second and third resonator cavities induce output signal frequency bias error in response to small body dimension changes, such as those induced by temperature changes. The third resonator passive cavity is positioned, i.e. is in parallel alignment, and is dimensioned in relation to the first and second resonator cavities to experience relatively equivalent optical path length changes in response to induced body dimension changes.

Referring to FIG. 7, in this particular embodiment, the carrier modulated offset frequency counterpropagating light beam 99 is the counterclockwise beam FCCW. This beam is formed to have a frequency of F2+FO. The first frequency partial light source beam 93 is the clockwise beam FCW. It has a frequency equal to F1. The first detector 119 represents a means responsive to the clockwise optical excitation for detecting the intensity of the third resonator clockwise beam FCW at frequency F1. The second detector 120 represents a means responsive to the counterclockwise optical excitation for detecting the intensity of the third resonator counterclockwise beam FCCW at frequency Fo+F2.

Both first and second servos 100, 110 operate to constantly adjust the frequency of the clockwise and counterclockwise beams by adjusting the first and second single frequency light source 97, 79 to compensate for effective path length changes due to body rate inputs about the passive ring resonator gyroscope sensitive axis 54.

Figure 8:
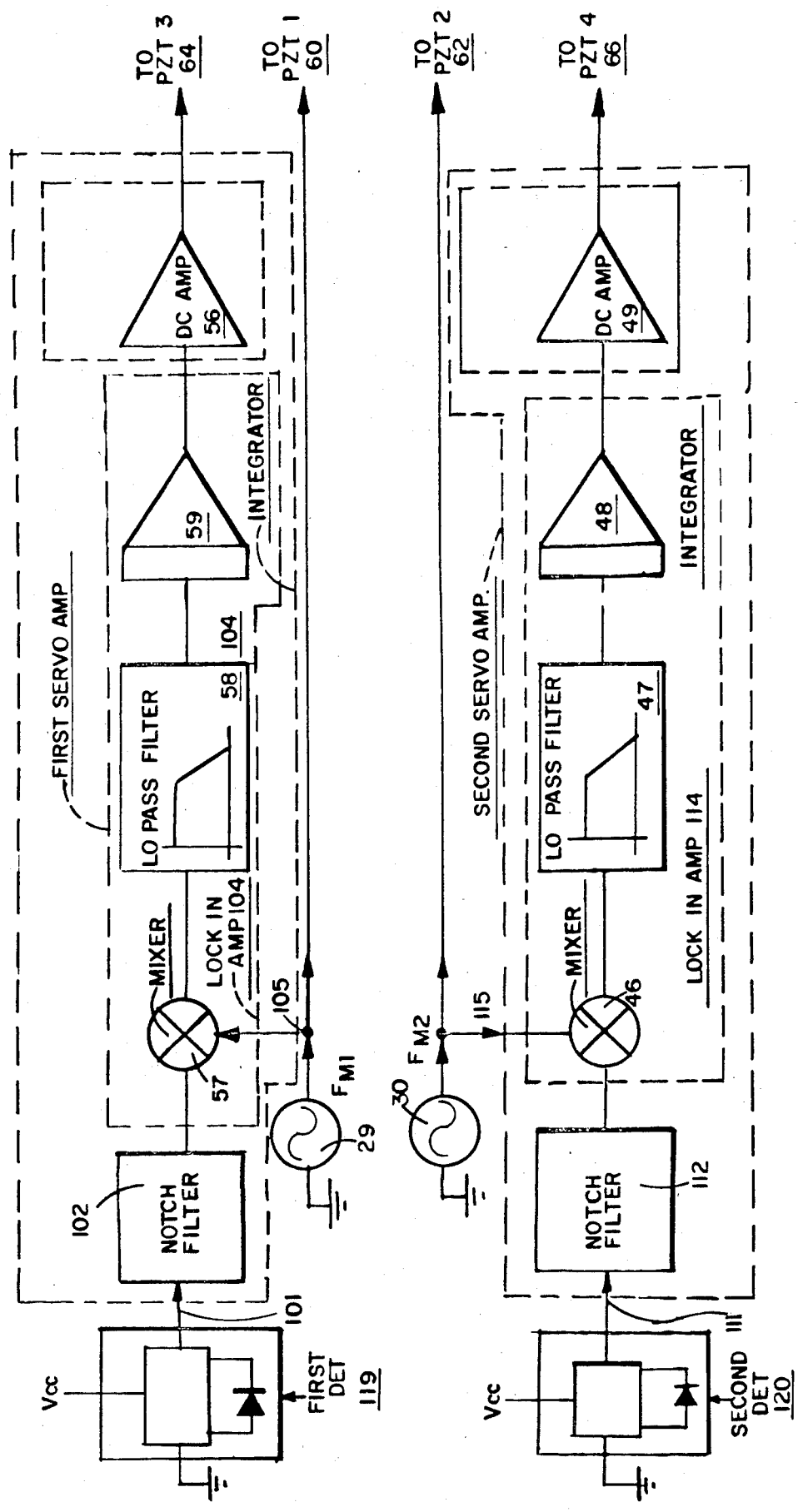
FIG. 8 is a schematic diagram of the cavity servo means for a two source passive ring resonator gyroscope.

Referring now to FIG. 8, the first servo amplifier 100 receives a reference first dither signal Fml at typically 1.0 kHz from a sinusoidal signal generator source 29. The sinusoidal dither signal is supplied as a reference input signal to the first servo amplifier mixer 57. Mixer 57 receives a second input from first detector 119 via notch filter 102. Notch filter 102 is designed to suppress all signals having information at frequency Fm2-Fml. Fml.

Mixer 57 provides an output signal to low pass filter 58. The output of low pass filter 58 is fed to integrator 59. The output of integrator 59 is fed to the input of DC AMP 56 where it is amplified and conditioned for application to the first laser transducer (PZT3) 64.

The second servo amplifier means 110 receives a second reference dither signal Fm2 at typically 4.0 kHz from a sinusoidal signal generator source 30. The sinusoidal dither signal is supplied as a reference input signal to the second servo amplifier mixer 46. Mixer 46 receives a second input from second detector 120 via notch filter 12. Notch filter 112 is designed to suppress all signals having information at frequency Fm2 - Fml.

Mixer 46 provides an output signal to low-pass filter 47. The output of low pass filter 47 is fed to integrator 48. The output of integrator 48 is fed to the input of DC AMP 49 where it is amplified and conditioned for application to the second laser transducer (PZT4) 66.

Although FIGS. 1 and 7 each depict use of straight cavities for the first and second laser means, the use of an L-shaped laser as the first and second resonator cavities above, below or in the same plane as the third resonator are anticipated to be alternative embodiments that can offer the promise for dimensional compensation. Additional alternative embodiments include an arrangement in which the first and second laser means have segments orientated to be transverse to the plane of the third resonator cavity.

Optical detector units (such as first detector 119 and second detector 120) typically contain a reversed biased PIN diode and a low noise preamplifier. A detector such as the SD-00-12-12-231 manufactured by the *Silicon Detector Corp.* of Newbury Park, Calif. is suitable for use with a Helium Neon laser light source.

Figure 9A:
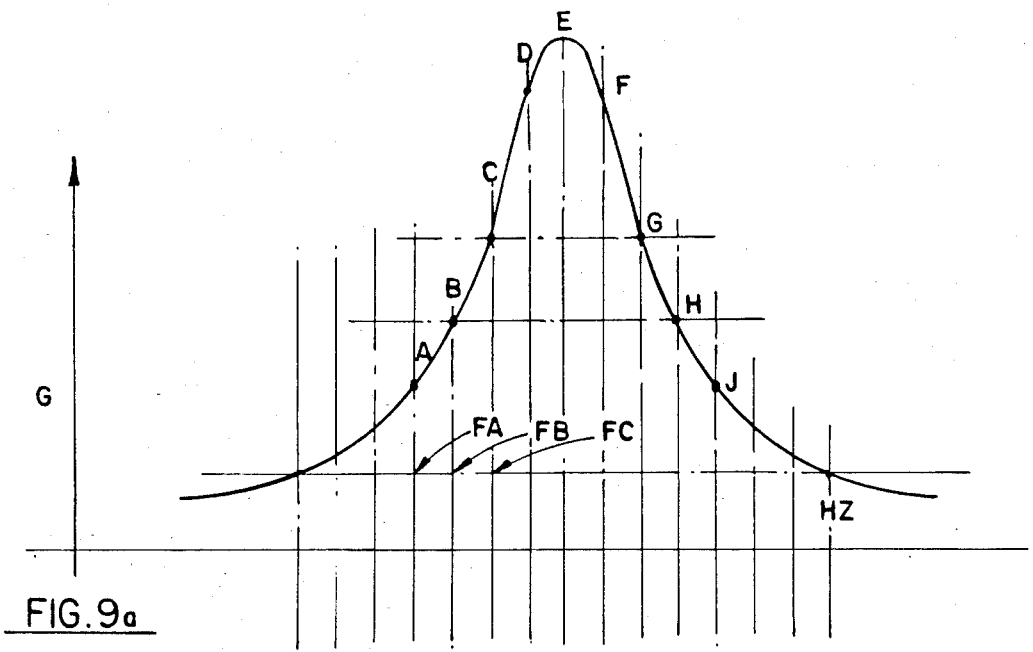
FIG. 9a is a waveform characterizing the signal response from a detector sensing light from an optical passive cavity as frequency is increased from below resonance to a frequency above resonance.

The principle of synchronous demodulation is explained by referring to FIG. 9a which shows the output response curve for a tuned system such as an optical resonator. The output response curve of FIG. 9a is meant to be similar in character to the response curve of FIG. 10a where the center frequency of an injected HeNe laser is $4.7 \times 10^{+14}$ Hz.

The first and second detectors 119 and 120 of FIG. 7 are positioned to receive reflected light as detector 1105 does from laser 1101 in FIG. 11a. FIG. 11c shows a response curve having a dip at resonance 1-113. This response characteristic corresponds to that for diode 1105 receiving the reflected input beam. The response curves for detectors 119 and 120 dips at resonance because, in the embodiment depicted by FIG. 1 and FIG. 7, these diodes receive reflected light from mirrored surfaces 45 and 44, respectively. At resonance, however, third cavity 18 absorbs light entering from ports 80 and 82, thereby leaving less light for reflection from the respective mirrored surface. Detector 118 receives the combined light from beamsplitters from which it detects the beat frequency. Detector 1109 of FIG. 11a positioned to receive light from resonator 1107 in accordance with the response characteristic 1111 of FIG. 11b. The relative position of detector 1109 to measure the transmitted light is not used in the embodiment of FIG. 7.

Figure 9B:
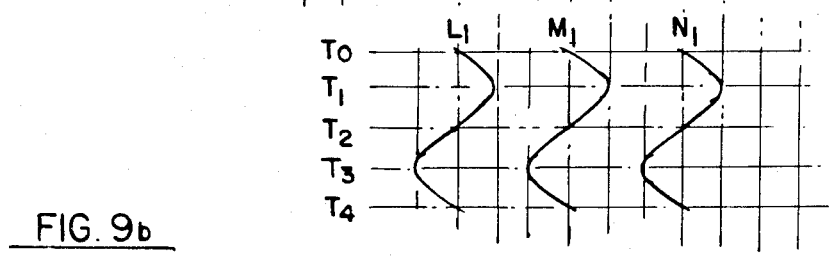
FIG. 9b shows three sinusoidal waveforms depicting identical frequency modulation ranges.

FIG. 9b shows waveforms Ll, Ml and Nl as they vary with increasing time from T0 to T4. These waveforms are meant to have amplitudes which when projected onto the horizontal axis of FIG. 9a, characterize the shift in frequency, or modulating range, of single frequency light being sourced to the cavity 18 via ports 80, 82.

At T0, waveform Ll provides light to the cavity at a frequency of FB. At frequency FB, the signal from the detector has an amplitude at 901 as shown in FIG. 9a. As time increases to T1, voltage Ll shifts or modulates the light source up in frequency to frequency FC at which point, the detector provides an output signal with amplitude peak 903. At T2, L1 returns the light source to frequency FB. At T2, the detector output returns to the amplitude 905. At time T3, modulation voltage L1 drives to FA and the detector output drops to a negative peak 907. At T4, L1 returns to FB with the detector again providing an amplitude at 909.

Figure 9C:
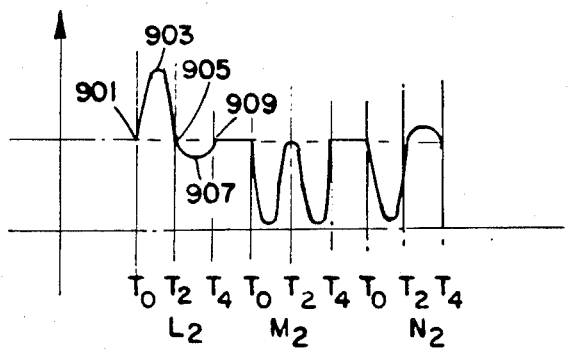
FIG. 9c shows three waveforms from detector diodes sensing light from the cavity of FIG. 9a as frequency is modulated in ranges characterized by the waveforms of FIG. 9b.

FIG. 9c shows the detector outputs amplitude referenced to zero volts by use of a dc blocking or decoupling circuit and synchronized with frequencies FA, FB and FC. The mixer receives a reference square wave signal synchronized to the waveforms of FIG. 9b. During the interval T0 to T2, the mixer multiplies the detector output times a factor of +1. During interval T2 to T4, the mixer multiplies the detector output by −1.

Figure 9D:
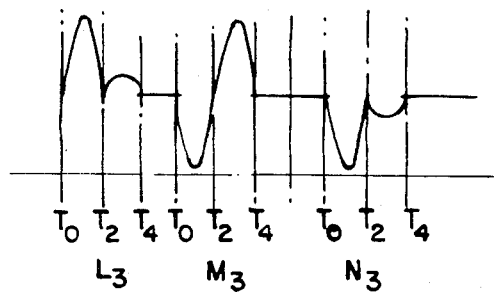
FIG. 9d shows the waveforms from a synchronous mixer receiving the signal waveforms of FIG. 9c.

FIG. 9d provides a characterization of the output of the mixer (57, 46) fed to the low-pass filter (58, 47) in synchronization with TO through T4. Due to the location of the modulation range associated with waveform L1, the mixer provides an output having two positive regions as shown by waveform L3.

A similar explanation can be made to show that the modulation range of M1 results in the detector output of M2 and the mixer output of M3, and that the modulation range of N1 results in the detector output of N2 and the mixer output of N3.

The low-pass filter excepts the signal of L3 to produce a net positive output, the signal of M3 to produce a zero output and the signal of N3 to produce a net negative output.

The signals of L3, M3 and N3 are integrated by the integrator (59, 48) to provide an error voltage to the respective PZT to shift the frequency of the laser.

The respective DC AMP (56, 49) is driven by the integrator to apply a signal to the PZT to move the frequency of the respective laser in a direction to increase the response of the signal from the third resonator cavity. As the signal from the DC AMP (56, 49) reaches a value sufficient to peak the tuning of the resonator at frequency E, the signal out of the low-pass filter goes to zero and the output of the integrator stops changing, leaving the frequency of the affected laser unchanged. A change in the body rate or a change due to induced drift moves the laser off resonance; however the servo responds by shifting the timing voltage to the PZT to re-establish resonance. The bandwidth of the low-pass filter and the frequency modulating the PZT1 and PZT2 limit the dynamic response of the system.

Referring to FIGS. 7 and 8, the LOCK-IN AMPLIFIERS 104, 114 function to mix a dither signal, such as Fml, typically near 1kHz and Fm2 typically near 4.0 kHz with a DETECTOR output signal that contains information at the respective Fm dither signal frequency. Using synchronous demodulation or phase sensitive detection technique, control information is obtained in high noise environments. Lock-in amplifiers of this type are sensitive to the phase relationship between the input information signal and the reference or dither signal of the lock-in amplifier. An in-phase information signal will provide an output response of one polarity and an 180° out-of-phase relationship will result in an output signal of an opposite polarity. A typical LOCK-IN AMPLIFIER suitable for laboratory use is the *PRINCETON APPLIED RESEARCH* Model 124A manufactured at *Princeton, N. J.* Amplifiers of this type are typically high Q DC amplifiers that provide a gain of several thousand at the reference or dither frequency and have virtually no gain at other frequencies above or below the reference frequency. For an information signal of a fixed level at the reference frequency, the amplifier typically provides a fixed DC level response at its output.

OPERATION

Due to the Sagnac effect, the path lengths of the clockwise (CW) and counterclockwise (CCW) beams in ring resonator differ as a function of body rotation rates. Consequently, the resonant frequencies for CW and CCW light in the passive cavity have a corresponding difference dependence. The goal of the optics and electronics of the Passive Ring Resonator Gyroscope (PRRG) is to detect the frequency difference that arises between the CW and CCW beams due to inertial rotations. The intent of the single body dual-linear laser/passive cavity design is to eliminate bias errors caused by the resonant frequencies of the linear laser and passive cavity changing with respect to one another. In this integral, single block, or single piece body these bias errors will also be independent of input rotation rates. The two cavities are arranged mechanically and geometrically to insure that shifts in laser frequency arising from body dimensional changes are experienced by both the passive resonator cavity and the linear laser cavity and therefore reduce the effect of such bias errors.

To obtain such bias compensation, the Free Spectral Range of the first and second resonant cavities 14, 16 are made equal to the Free Spectral Range of the third resonant cavity 18. The Free Spectral Range (F.S.R.)=c/p where c is the speed of light and p is the optical round trip pathlength of a resonator. Thus, the F.S.R. of a square passive ring resonator with sides of length L is c/4L. To meet the F.S.R. requirement, two cases arise contingent upon the linear resonator design. The first and second resonators forming the first and second laser means are comprised of a mirror with no curvature, i.e. a flat mirror, and a mirror with a predetermined radius of curvature, i.e. a curved mirror, the required resonator length between mirrors is L. The F.S.R. of this flat mirror, curved mirror resonator equals c/4L. However, a resonating using two curved mirrors requires a resonator length between mirrors equal to 2L. This configuration also has a F.S.R. equaling c/4L. With the criteria $(F.S.R.)_{Laser} = (F.S.R.)_{Passive\ Resonator} = c/4L$, it is apparent that any change in the F.S.R. of the laser resonator will equal any change in the F.S.R. of the passive ring resonator which may arise from thermal or mechanical changes.

Mirrors with piezoelectric (PZT) backings supply a modulation means to the passive resonator cavity; this modulation effects both the CW and CCW beams. This modulation or dither frequency Fml and Fm2 is a sinusoid of typically 1–4 kHz.

Light leaving the passive third cavity from the CW direction is detected and phase sensitive demodulated by employing a lock-in amplifier. The error signal drives a piezoelectric backed mirror in the first linear laser to bring it into the CW beam's resonance. In the preferred embodiment, the DC error signal is applied to PZT3. The modulation signal Fml is applied to PZT1. Light leaving the passive third cavity from the CCW direction is detected and phase sensitive demodulated by employing a lock-in amplifier. The error signal drives a piezoelectric backed mirror in the second linear laser to bring it into the CCW beam's resonance. In the preferred embodiment, the DC error signal is applied to PZT2. Another modulation signal Fm2 is applied to PZT4. The bandwidth of the gyroscope is limited by the bandwidth of PZTs used in this system. The unique property of this configuration is that only two servo loops are needed.

Acousto-Optics

The AO device is typically made up of a piezoelectric transducer attached to a crystal. The AO device is fabricated from a piezoelectric crystal material such as quartz, $TeO_2$ (Telurium Dioxide) or $PbMoO_4$ (Lead Molybdate). In the preferred embodiment, the transducer, driven at FO, establishes an acoustic wave FO in the crystal. Associated with the acoustic wave is a varying index of refraction due to the compressions and rarefactions of atomic density in the crystal. Incoming light diffracts off this induced grating giving rise to many orders of diffracted beams. The 0th order beam is at the frequency of the single frequency light, Fo. The first order beam has the frequency Fo+F2, where F2 is the frequency of the acoustic wave. The output from the AO device has the discrete frequencies Fo +nFs where n=0,1,2... each separated in space by an angle proportioned to n. Thus, we see that by shifting the AO wave frequency by 1 Hz, we can add 1 Hz to the frequency of the first order beam exiting the AO device. (See e.g., *Optical Waves in Crystals*, A. Yariv & P. Yeh (John Wiley & Sons)

Although the invention has been disclosed and illustrated in detail, it is to be clearly understood that the same is by way of illustration as an example only and is not to be taken by way of limitation. The spirit and scope of this invention is to be limited only by the terms of the appended claims.

What is claimed is:

1. A two source passive ring resonator gyroscope having enhanced stability and sensitivity comprising:
    a dither signal means for providing a first and second dither signal at first and second dither signal frequencies (Fm1, Fm2);
    a reference signal generator for providing a reference carrier signal at a fixed reference carrier frequency (FO);
    a single piece body having integral first, second and third resonator cavities;
    a first laser means using said first resonator cavity and having a first cavity path length adjusting means for providing a first single frequency light source (Fl);
    a second laser means using said second resonator cavity and having a second cavity path length adjusting means for providing a second single frequency light source (F2);
    said third resonator cavity being a passive high Q evacuated cavity having a closed optical path tuned to resonate at substantially the light frequency of said first and second resonator cavities, the sensitive axis of said two source passive ring resonator gyroscope being essentially normal to the plane of said closed optical path;
    means responsive to said first single frequency light source for splitting said first single frequency light source into a propagating source and a reference first frequency light source, said propagating source being coupled into said third resonator cavity to form a propagating light beam (FCW);
    means responsive to said second single frequency light source for splitting said second single frequency light source into a second frequency partial light source and into a reference second frequency light source;
    means for modulating light from said second frequency partial light source at said reference carrier frequency (FO) to form a carrier modulated offset frequency counterpropagating light source and for coupling said carrier modulated offset frequency counterpropagating light source (FCCW) into said third resonator cavity;
    a first detector positioned to sample said propagating beam and a second detector positioned to sample said counterpropagating beam;
    cavity servo means responsive to said first and second dither signals and to output signals from said first and second detectors for providing control signals to said first and second cavity path length adjusting means to control the resonant frequency of said first and second single frequency light sources (Fl, F2), said first single frequency light source being tuned to control and maintain said propagating light beam in said third resonator at peak resonance, and to tune said second single frequency light source to control and maintain said carrier modulated offset frequency counterpropagating light beam (FCCW) at peak resonance;
    output means for measuring the frequency difference between said reference first frequency light source and said reference second frequency light source, said frequency difference representing the difference due to a gyro body rate input increased by the fixed frequency of the carrier offset frequency (FO).

2. The two source passive ring laser gyroscope of claim 1 wherein said third resonator cavity further comprises:
    first and second partially transmissive and receiving ports,
    said first partially transmissive and receiving port being characterized to receive and pass said first single frequency light source into said third resonator cavity to form said propagating light beam (FCW);
    said second partially transmissive and receiving optical port being characterized to receive and pass said carrier modulated offset frequency counterpropagating light beam (FCW) into said third resonator cavity to form a counterpropagating light beam (FCCW) in said third resonator.

3. The two source passive ring laser gyroscope of claim 2 wherein said third cavity further comprises:
    a first resonator transducer positioned to drive a first reflective surface in said third resonator cavity, said first cavity transducer being responsive to said first dither signal at said first dither signal frequency for modulating the optical path length of said third resonator cavity at a first dither signal frequency; and
    a second resonator transducer positioned to drive a second reflective surface in said third resonator cavity, said second cavity transducer being responsive to said second dither signal at said second dither signal frequency for modulating the optical path length of said third resonator cavity at a second dither signal frequency;
    a first detector for receiving a relatively small percentage of said propagating light beam (FCW)

from said first partially transmissive and receiving port;

a second detector for receiving a relatively small percentage of said counterpropagating light beam (FCCW) from said second partially transmissive and receiving port; and, wherein said servo means has:

a first servo means having a synchronizing input responsive to said first dither signal and a signal input responsive to the output signal of said first detector, said first servo means providing an output signal to said first laser transducer to tune said first single frequency light source to maximize the signal detected by said first detector; and a second servo means having a synchronizing input responsive to said second dither signal and a signal input responsive to the output signal of said second detector, said second servo means providing an output signal to said second laser transducer to tune said second single frequency light source to maximize the signal detected by said second detector;

whereby, the frequency of the propagating and counterpropagating beams (clockwise and counterclockwise beams) are constantly adjusted to compensate for effective path length changes due to body rate inputs to said passive ring resonator gyroscope sensitive axis.

4. The two source passive ring resonator gyroscope of claim 1 wherein said third resonator cavity further comprises:

at least first, second and third evacuated hollow segments, the segments being coupled at their ends to form a closed planar evacuated path;

reflective means for providing a reflective surface at the intersection of each pair of segments to form a closed optical path.

5. The two source passive ring resonator gyroscope of claim 1 wherein said means for modulating light from said second frequency partial light source at a reference carrier frequency (FO) further comprises:

an acousto-optic transducer positioned to receive said second frequency partial light, at said acousto-optic transducer being driven by said reference carrier signal from said reference signal generator at a reference carrier frequency (FO) to provide said carrier modulated offset frequency counterpropagating light source having a frequency equal to the frequency of said second frequency partial light source plus the frequency of said reference carrier frequency.

6. The passive ring resonator gyroscope of claim 4 wherein said cavity servo means is further characterized to have:

a first servo means having a synchronizing input responsive to said first dither signal and a signal input responsive to the output signal of said first detector, said first servo means providing an output signal to said first laser transducer to tune said first single frequency light source to maximize the signal having a first dither signal component detected by said first detector;

a second servo means having a synchronizing input responsive to said second dither signal and a signal input responsive to the output signal of said second detector, said second servo means providing an output signal to said second laser transducer to tune said second single frequency light source to maximize the signal having a second dither signal component detected by said second detector;

whereby, the frequency of the clockwise and counterclockwise beams are constantly adjusted to compensate for effective path length changes due to body rate inputs to said passive ring resonator gyroscope sensitive axis.

7. The two source passive ring resonator gyroscope of claim 1 wherein said means responsive to first single frequency light source for splitting said first single frequency light source into a propagating source and a reference first frequency light source further comprises:

a first beamsplitter; and, wherein said means responsive to said second single frequency light source for splitting said second single frequency light source into a second frequency partial light source and into a reference second frequency light source further comprises:

a second beamsplitter;

said first and second beamsplitters being positioned to coaxially combine said reference first frequency light source and said reference second frequency light source and to direct said coaxially combined beam to said output means.

8. The two source passive ring resonator gyroscope of claim 7 wherein said output means for measuring the frequency difference between said coaxially combined reference first frequency light source and said reference second frequency light source further comprises:

an output counter having an input; and an output detector positioned to receive said coaxially combined reference first frequency light source beam and reference second frequency light source beam, said output detector providing an output detector signal to said output counter input.

9. The two source passive ring resonator gyroscope of claim 3 wherein said first laser means first cavity path length adjusting means further comprises:

a first laser transducer having a signal input terminal; and, wherein said first servo means first servo amplifier has:

a notched filter having an input and an output;

a lock-in amplifier having an input and an output; and an output amplifier having an input and an output;

said first servo amplifier notched filter input being coupled to receive the output signal from said first detector, said notched filter being characterized to suppress signal information having a second dither signal component;

said first servo amplifier lock-in amplifier having a synchronizing input coupled to receive said first dither signal from said first dither signal generator, said lock-in amplifier input being coupled to said notched filter output, said lock-in amplifier being characterized to amplify information having a first dither signal component;

said first servo output amplifier input being coupled to said lock-in amplifier output, said first servo output amplifier output being coupled to said first laser transducer signal input; and wherein said second laser means second path length adjusting means further comprises:

a second laser transducer having a signal input terminal; and wherein said second servo means has a second servo amplifier having:

a notched filter having an input and an output;
a lock-in amplifier having an input and an output; and
an amplifier having an input and an output;
said second servo amplifier notched filter input being coupled to receive the output signal from said second detector, said notched filter being characterized to suppress signal information having a first dither signal component;
said second servo amplifier lock-in amplifier having a synchronizing input coupled to receive said second dither signal from said second dither signal generator, said lock-in amplifier input being coupled to said notched filter output, said lock-in amplifier being characterized to amplify information having a second dither signal component;
said second servo output amplifier input being coupled to said lock-in amplifier output, said second servo output amplifier output being coupled to said second laser transducer signal input.

10. The two source passive ring resonator gyroscope of claim 1 wherein said first and second resonator cavities are positioned transverse to the plane of said third resonator cavity.

11. The two source passive ring resonator gyroscope of claim 1 wherein said first and second resonator cavities are positioned in parallel plane relation to said third resonator cavity.

12. The two source passive ring resonator gyroscope of claim 1 wherein said first and second resonator cavities are positioned to be coplanar.

13. The two source passive ring resonator gyroscope of claim 1 wherein said first, second and third resonator cavities are positioned to be coplanar.

14. The two source passive ring resonator gyroscope of claim 1 wherein at least one of said first and second resonator cavities is transverse to said third resonator cavity.

15. The two source passive ring resonator gyroscope of claim 1 wherein said means responsive to said first single frequency light source for splitting said first single frequency light source into a propagating source and a reference first frequency light source and for coupling said propagating source into said third resonator cavity further comprises:
a prism characterized to receive said propagating source from said first single frequency light source and to direct said propagating source to the plane of said third resonator cavity and to redirect said propagating source into said third resonator cavity.

16. The two source passive ring laser gyro of claim 1, wherein:
said third resonator cavity is positioned and dimensioned in relation to the first resonator cavity to provide partial dimensional change compensation for optical path length changes in response to said induced body dimension changes;
whereby, bias errors relating to temperature induced body dimension changes or to changes from external forces applied to said body are cancelled providing a passive ring resonator gyroscope having enhanced stability using only two servos.

17. A two source passive ring resonator gyroscope having enhanced stability and sensitivity comprising:
a reference signal generator for providing a reference carrier signal at a fixed reference carrier frequency (FO);

a single piece body having integral first, second and third resonator cavities;
a first laser means using said first resonator cavity and having a first cavity path length adjusting means for providing a first single frequency light source (F1) through at least one partially transmissive port;
a second laser means using said second resonator cavity and having a second cavity path length adjusting means for providing a second single frequency light source (F2) through at least one partially transmissive port;
said third resonator cavity having at least a first partially transmissive receiving port, said third resonator cavity being a passive high Q evacuated cavity having a closed optical path tuned to resonate at substantially the light frequency of said first and second resonator cavities, the sensitive axis of said two source passive ring resonator gyroscope being essentially normal to the plane of said closed optical path;
means responsive to said first single frequency light source F(1) for splitting said first single frequency light source into a propagating source and a reference first frequency light source and for coupling said first single frequency from said first laser partially transmissive port through said third resonator partially transmissive receiving port into said third resonator cavity to form a propagating light beam (FCW);
means responsive to said second single frequency light source F(2) for splitting said second single frequency light source into a second frequency partial light source and into a reference second frequency light source;
means for coupling said second single frequency light source from said second laser partially transmissive port and for modulating light from said second frequency partial light source at said reference carrier frequency (FO) to form a carrier modulated offset frequency counterpropagating light source and for coupling said carrier modulated offset frequency counterpropagating light source through said third resonator partially transmissive port (FCCW) into said third resonator cavity;
a dither signal means for providing a first and second dither signal at first and second dither signal frequencies (Fm1, Fm2) and for modulating the path length of said third resonator cavity at said first and second dither signal frequencies;
a first detector positioned to sample a relatively small percentage of said propagating light beam (FCW) from said first partially transmissive and receiving port; said propagating beam and a second detector positioned to sample a relatively small percentage of said counterpropagating light beam (FCCW) from said second partially transmissive and receiving port; said counterpropagating beam;
cavity servo means responsive to said first and second dither signals and to output signals from said first and second detectors for providing control signals to said first and second cavity path length adjusting means to control the resonant frequency of said first and second single frequency light sources (F1, F2), said first single frequency light source being tuned to control and maintain said propagating light beam in said third resonator at peak resonance, and to tune said second single frequency light source to control and maintain said carrier modulated offset frequency counterpropagating light beam (FCCW) at peak resonance;

output means for measuring the frequency difference between said reference first frequency light source and said reference second frequency light source, said frequency difference representing the difference due to a gyro body rate input increased by the fixed frequency of the carrier offset frequency (FO).

18. The two source passive ring laser gyroscope of claim 17 wherein said third resonator cavity further comprises:

first and second partially transmissive and receiving ports, said first partially transmissive and receiving port being characterized to receive and pass said first single frequency light source into said third resonator cavity to form said propagating light beam (FCW);

said second partially transmissive and receiving optical port being characterized to receive and pass said carrier modulated offset frequency counterpropagating light beam (FCW) into said third resonator cavity to form a counterpropagating light beam (FCCW) in said third resonator.

19. The two source passive ring laser gyroscope of claim 2 wherein said third cavity further comprises:

a first resonator transducer positioned to drive a first reflective surface in said third resonator cavity, said first cavity transducer being responsive to said first dither signal at said first dither signal frequency for modulating the optical path length of said third resonator cavity at a first dither signal frequency; and a second resonator transducer positioned to drive a second reflective surface in said third resonator cavity, said second cavity transducer being responsive to said second dither signal at said second dither signal frequency for modulating the optical path length of said third resonator cavity at a second dither signal frequency; and, wherein said servo means has:

a first servo means having a synchronizing input responsive to said first dither signal and a signal input responsive to the output signal of said first detector, said first servo means providing an output signal to said first laser transducer to tune said first single frequency light source to maximize the signal detected by said first detector; and a second servo means having a synchronizing input responsive to said second dither signal and a signal input responsive to the output signal of said second detector, said second servo means providing an output signal to said second laser transducer to tune said second single frequency light source to maximize the signal detected by said second detector;

whereby, the frequency of the propagating and counterpropagating beams (clockwise and counterclockwise beams) are constantly adjusted to compensate for effective path length changes due to body rate inputs to said passive ring resonator gyroscope sensitive axis.

* * * * *